US005144272A

United States Patent [19]

Nishimura

[11] Patent Number: 5,144,272

[45] Date of Patent: Sep. 1, 1992

[54] ELECTROMAGNETIC SOLENOID FOR OIL HYDRAULIC CONTROL VALVES

[75] Inventor: Toshihiko Nishimura, Hyogo, Japan

[73] Assignee: Mitsubishi Denki K.K., Tokyo, Japan

[21] Appl. No.: 680,256

[22] Filed: Apr. 4, 1991

[30] Foreign Application Priority Data

Apr. 11, 1990 [JP] Japan .............................. 2-39286[U]

[51] Int. Cl.$^5$ .......................... H01F 7/08; F16K 31/02

[52] U.S. Cl. .................................... 335/255; 335/258; 251/129.15

[58] Field of Search ............................... 335/255, 258; 251/129.08, 129.15, 129.21, 129.22

[56] References Cited

U.S. PATENT DOCUMENTS 4,677,409 6/1987 Kozuka et al. ...................... 335/258

4,778,147 10/1988 Kozuka et al. ................. 251/129.15

*Primary Examiner*—Harold Broome

*Attorney, Agent, or Firm*—Sughrue, Mion, Zinn, Macpeak & Seas

[57] ABSTRACT

An electromagnetic solenoid for oil hydraulic control valves including an oil flow notch on a magnetic sleeve bearing; an axially extending oil flow notch on a non-magnetic stopper washer; an oil flow gap between a movable iron core and an operating rod; and an axially extending oil flow notch on the operating rod so that oil can flow easily and freely by movement of a movable iron core and the operating rod. Since the profiles of the notches are simple and the operation rod is uniform in outer diameter, the solenoid can be formed easily and inexpensively, with additional advantages of improved magnetic property and response.

7 Claims, 2 Drawing Sheets

ELECTROMAGNETIC SOLENOID FOR OIL HYDRAULIC CONTROL VALVES

BACKGROUND OF THE INVENTION

1. Field of the Invention

The invention relates to an electromagnetic solenoid which is connected to an oil hydraulic control valve to actuate it. More particularly, it is directed to an improvement of the solenoid which facilitates flow of oil loaded into the solenoid from the hydraulic control valve by movement of a movable core of the solenoid.

2. Related Art

FIG. 7 is a longitudinal sectional view showing a conventional electromagnetic solenoid for oil hydraulic control valves, the upper half of which shows a post-operation state and the lower half of which shows a pre-operation state. FIG. 8 is a side view of the electromagnetic solenoid shown in FIG. 7. In FIGS. 7 and 8, an electromagnetic coil 1 is wound around a bobbin 2, and a lead wire 3 of the electromagnetic coil 1 passes through and extends out from a grommet 16. A case 4, which is made of a magnetic metal, contains the electromagnetic coil portion 1. One end of the case 4 has an oil flow hole 4*a* extending in its axial direction, and a male screw portion 4*b* is provided at its outside diameter portion. A magnetic path iron core 5, which is made of a magnetic metal and firmly coupled with the case 4 while caulked by a flange 5*a*. Reference numeral 6 designates a fixed iron core. An operating rod 7, which is made of a nonmagnetic material, is movable in its axial direction, and its rear end is supported by the magnetic path iron core 5 through a slide roll bearing 8, while its front end is supported by the case 4 through a sleeve bearing 9. A movable iron core 10 is secured to the operating rod 7. The outer surface on the rear end side of the movable iron core 10 corresponds with the inside diameter of the magnetic path iron core 5 and its front end confronts with the rear end of the fixed iron core 6. Reference numeral 11 designates a buffer spring for receiving the withdrawing operating rod 7; 12, a nonmagnetic spring receptacle; 13, 14, O rings; 15, a filler resin body used to fill a gap formed between the inner surface of the case 4 and the electromagnetic coil 1.

The electromagnetic solenoid thus constructed is screwed into a housing 17 of the oil hydraulic control valve at the male screw portion 4*b* of the case 4 and an end of the operating rod 7 is in contact with a valve rod 18 of the hydraulic control valve. Reference numeral 19 designates an O ring.

The operation of such an electromagnetic solenoid will be described next. Normally, the electromagnetic coil 1 is not energized. Thus, the operating rod 7 is set to a withdrawal position while resisting the spring pressure of the buffer spring 11 by return of the valve rod 18 caused by a return spring (not shown) of the oil hydraulic control valve.

When the electromagnetic coil 1 has been energized, the movable iron core 10 is attracted toward the fixed iron core 6, causing the operating rod 7 to advance in the direction of A while moving the valve rod 18 ahead.

In the meantime, operating oil within the housing 17 of the oil hydraulic control valve is filled in the case 4 through the oil flow hole 4*a*. To allow a smooth flow of oil, the following means are provided.

(1) The oil flow hole 4*a* of the case 4;

(2) A gap between the inside diameter of the fixed iron core 6 and the outside diameter of the operating rod 7;

(3) A gap 20 between the movable iron core 10 and the fixed iron core 6; and (4) A gap between the inside diameter of the magnetic path iron core 5 and the outside diameter of the movable iron core 10.

However, the conventional electromagnetic solenoid thus constructed has entailed the following problems.

(1) The oil flow hole 4*a* must be provided at the front end portion of the case 4, which requires cumbersome work of drilling a small-diameter, long hole.

(2) An oil flow path must be provided by a gap 20 between the front end of the movable iron core 10 and the rear end of the fixed iron core 6 with the operating rod 7 being at the advance position, and this has required a stopper portion 21 to be provided at the inner end of the inside diameter portion on the front end side of the case 4 so that advance of the operating rod 7 can be stopped.

(3) A gap between the inside diameter of the magnetic path iron core 5 and the outside diameter of the movable iron core 10 serves as an oil flow path, and this increases the air gap of the magnetic path, resulting in reduced magnetic property and impaired response.

SUMMARY OF THE INVENTION

The invention has been made to overcome the above problems. Accordingly, an object of the invention is to provide an electromagnetic solenoid for oil hydraulic control valves which is easily formable and inexpensive with simple profiles of the front end portion of its case and of its operating rod and whose magnetic property and response are improved with a shorter length in its external profile.

An electromagnetic solenoid for oil hydraulic control valves includes an axially extending oil flow notch portion on the outside diameter portion of a sleeve bearing secured to the inside diameter portion on the front end side of a case and an axially extending oil flow notch on the inside diameter portion of a nonmagnetic stopper washer for stopping advance of a movable iron core by being abutted against the inner end portion of a fixed iron core. The inside diameter on the front end side of the movable iron core is larger than the outside diameter of an operating rod to provide an oil flow gap, while the inside diameter on its rear end is smaller than the outside diameter of the operating rod to have the operating rod secured to the movable iron core. The outside diameter portion of the operating rod which is secured to the movable iron core is provided with an axially extending oil flow notch so that oil can flow freely by movement of the movable iron core and operating rod, and the operating rod is uniform in outside diameter. Further, the magnetic sleeve bearing is secured to the inside diameter of a magnetic path iron core to support the movable iron core.

The invention allows the operating oil to flow freely from the oil hydraulic control valve side to the oil flow notch portion of the sleeve bearing, inside diameter portion of the fixed iron core, oil flow notch of the stopper washer, inside diameter portion of the movable iron core, and oil flow notch of the rear end portion of the operating rod. The radially extending air gap between the movable iron core and the magnetic path iron core can be made small and the magnetic property can thus be improved. In addition, the notch portions of the sleeve bearing, stopper washer, and operating rod can be formed easily, and the operating rod with no step can also be formed simply.

DETAILED DESCRIPTION OF THE PREFERRED EMBODIMENTS

Figure 2:
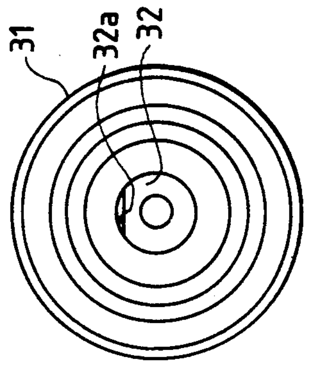
FIG. 2 is a side view of the embodiment shown in FIG. 1.
Figure 1:
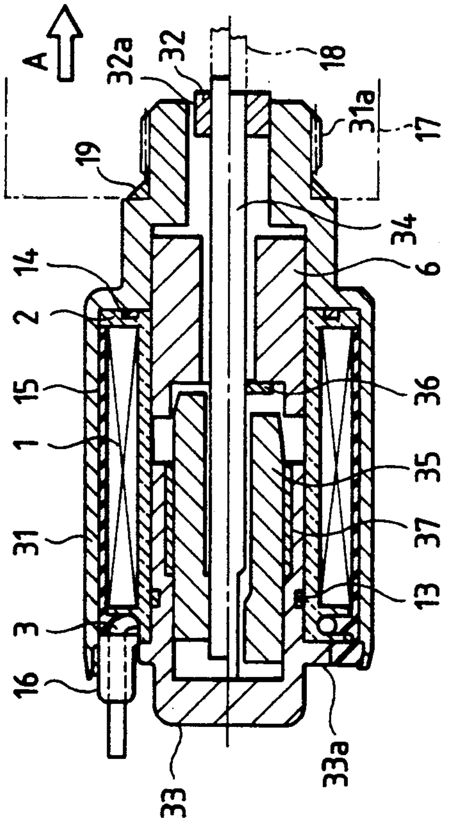
FIG. 1 is a longitudinal sectional view showing an embodiment of the invention.
Figure 3:
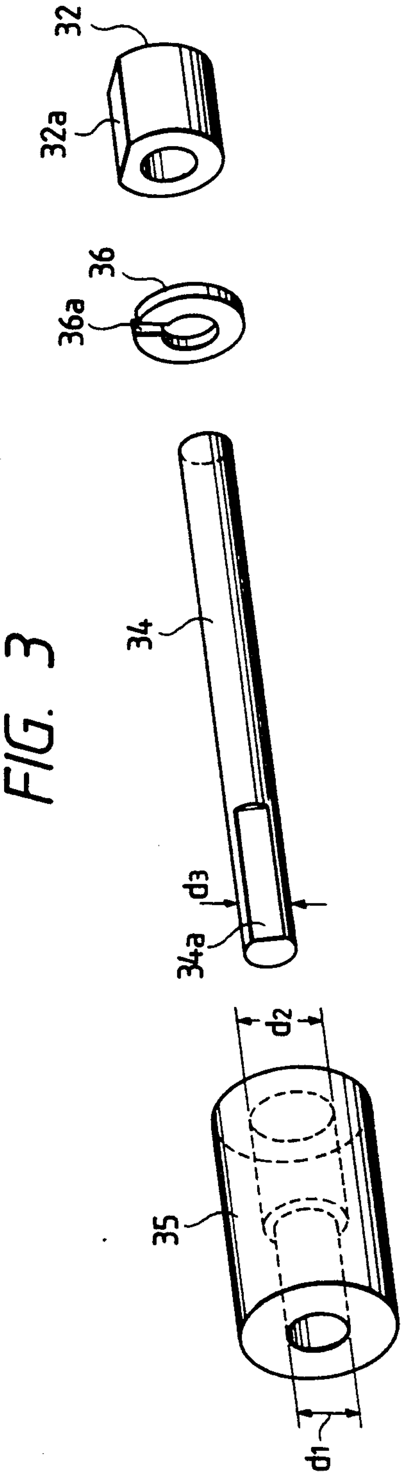
FIG. 3 is an exploded perspective view of the main portion of the embodiment shown in FIG. 1.
Figure 4A:
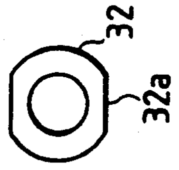
FIGS. 4 (*a*) and (*b*) are side views showing a sleeve bearing.
Figure 4B:
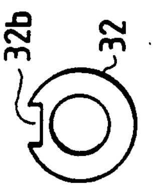

FIG. 1 is a longitudinal sectional view showing an electromagnetic solenoid for oil hydraulic control valves, which is an embodiment of the invention. The upper portion of FIG. 1 shows a post-operation state after operation and its lower portion shows a pre-operation state before operation. FIG. 2 is a side view of the electromagnetic solenoid shown in FIG. 1. In FIGS. 1 and 2, reference numerals 1 to 3, 6, 13 to 19 designate the same parts as in the conventional solenoid. Around the outside diameter portion on the front end side of a case 31, which is made of a magnetic material to accommodate the electromagnetic coil portion 1, is a male screw portion 31*a* to be screwed into the housing 17 of an oil hydraulic control valve. A sleeve bearing 32 is secured to the inside diameter portion on the front end side of the case 31 and has an axially extending flat oil flow notch 32*a* as shown in FIG. 3. This notch portion 32*a* may be provided at two positions as shown in FIG. 4 (*a*), or may be formed into a groove-like notch portion 32*b* as shown in FIG. 4 (*b*).

Returning to FIG. 1, a magnetic path iron core 33 is coupled with the case 31 while caulked by a flange 33*a*. An operating rod 34 is so formed as to have no step along its length, thus being uniform in outside diameter. The outside diameter portion on the rear end side of the operating rod 34 is provided with a flat notch 34*a* so that oil can flow as shown in FIG. 3.

A movable iron core 35 is secured to the rear end portion of the operating rod 34 and is formed as shown in FIG. 3. Its inside diameter $d_1$ is formed smaller than the outside diameter $d_3$ of the operating rod 34 and secured to the operating rod 34 by press fitting. Also, its inside diameter $d_2$ on the front end side is formed larger than the outside diameter $d_3$ of the operating rod 34, and a gap formed therebetween forms an oil flow path, communicating with the notch portion 34*a* of the operating rod 34 and allowing the oil to flow freely so that advance and withdrawal movements of the movable iron core 35 are not disturbed. A nonmagnetic stopper washer 36, which passes through the operating rod 34 and which is interposed between the fixed iron core 6 and the movable iron core 35, has a notch portion 36*a* in its radial direction and serves to allow the oil to flow in the axial direction of the solenoid. The notch portion 36*a* communicates a gap between the inside diameter portion of the fixed iron core 6 and the outside diameter portion of the operating rod 34 to a gap between the inside diameter portion of the movable iron core 35 and the outside diameter portion of the operating rod 34, allowing the oil to flow freely. The notch portion 36*a* can be formed simultaneously with the press forming of the stopper washer 36.

A sleeve bearing 37, made of a magnetic material, is secured to the inside diameter portion of the magnetic path iron core 33 and supports the movable iron core 35. A radially extending air gap between the magnetic path iron core 33 and the movable iron core 35 can be made small because it does not constitute an oil flow path, and contributes to greatly improving the magnetic property with the help of the magnetic sleeve bearing 37.

The operation of such an electromagnetic solenoid will be described next. The operating rod 34 is set to a withdrawal position, which is a pre-operation state, by return of a valve rod 18 of the oil hydraulic control valve. When the electromagnetic coil 1 has been energized, the movable iron core 35 is attracted toward the fixed iron core 6 and the operating rod 34 advances and causes the valve rod 18 to move ahead so as to control the hydraulic pressure. When the electromagnetic coil 1 has been deenergized, the operating rod 34 is withdrawn by a return spring of the oil hydraulic control valve through the valve rod 18. Although the operating oil is filled in the electromagnetic solenoid, the oil flows through the respective oil flow paths communicating with each other even if the movable iron core 35 and the operating rod 34 move. This allows the operating rod 34 to move smoothly with no response delay.

Figure 5A:
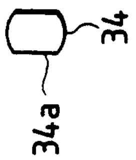
FIGS. 5 (*a*) and (*b*) are side views showing an operating rod.
Figure 5B:
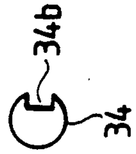

FIGS. 5 (*a*) and (*b*) show other embodiments of the notch portion of the operating rod 34. Shown in FIG. 5 (*a*) are a pair of notch portions 34*a*, while shown in FIG. 5 (*b*) is a groove-like notch portion 34*b*.

Figure 6:
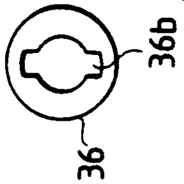
FIG. 6 is a side view showing a nonmagnetic stopper washer.
Figure 7:
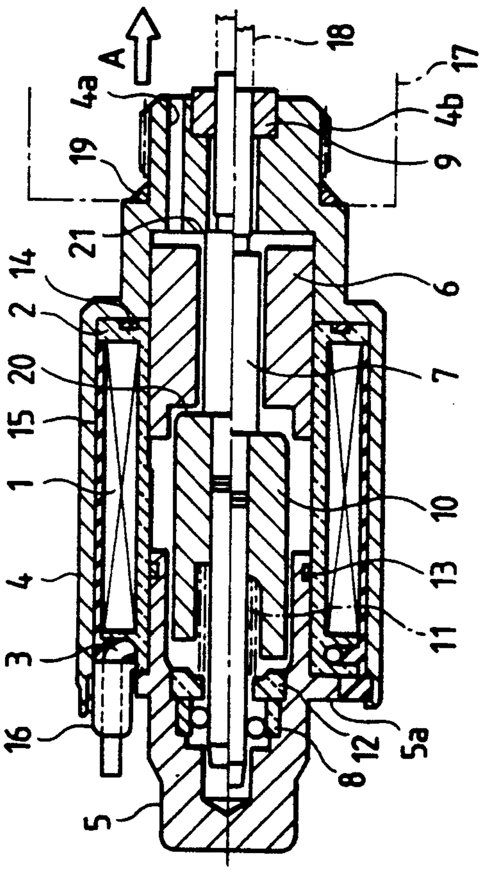
FIG. 7 PRIOR ART
FIG. 7 is a longitudinal sectional view showing a conventional electromagnetic solenoid for oil hydraulic control valves.
Figure 8:
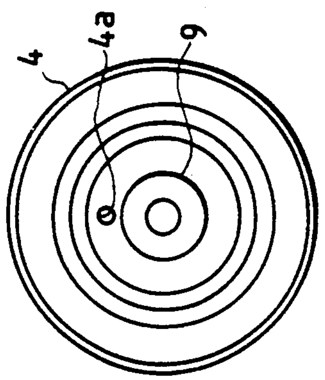
FIG. 8 PRIOR ART
FIG. 8 is a side view showing the magnetic solenoid shown in FIG. 7.

FIG. 6 shows another embodiment of the notch portion of the nonmagnetic stopper washer 36. A plurality of notch portions 36*b* are provided at the inside diameter portion.

As described above, in the invention, the sleeve bearing, which is secured to the inside diameter portion on the front end side of the case, has an oil flow notch portion provided at the outside diameter portion thereof; the operating rod made of a round rod, has an oil flow notch portion provided at the outside diameter portion on the rear end side thereof; and an oil flow path is formed by providing a gap between the inside diameter portion on the front end side of the movable iron core and the operating rod. And the inside diameter portion on the rear end side of the movable iron core is secured to the outside diameter portion of the operating rod at which the notch portion is provided, and the nonmagnetic stopper washer having an oil flow notch portion is inserted between the fixed iron core and the movable iron core, both corresponding to each other in the axial direction of the solenoid. Therefore, not only the case and operating rod profiles become simple, easily and inexpensively formable, but also the magnetic path iron core can be made shorter.

In addition, the movable iron core is supported by firmly securing the magnetic sleeve bearing to the inside diameter portion of the magnetic path iron core so that the radially extending air gap formed between the magnetic path iron core and the operating rod is made small.

Therefore, its magnetic property is improved, thereby increasing its performance.

What is claimed is:

1. An electromagnetic solenoid for oil hydraulic control valves comprising:

an electromagnetic coil wound around a bobbin;

a case for accommodating said electromagnetic coil, said case being made of a magnetic material;

a cylindrical fixed iron core secured to a front portion of said case;

a sleeve bearing being secured to an inside diameter portion on the front end side of said case and having an axially extending oil flow notch member at an outside diameter portion thereof;

a magnetic path iron core being coupled with the rear end side of said case;

an operating rod passing through an inside diameter portion of said fixed iron core with a gap, a front end portion of said operating rod extruding while supported by said sleeve bearing so as to be movable in an axial direction of said electromagnetic solenoid, an outside diameter portion on the rear end side of said operating rod having an axially extending oil flow notch member;

a hollow movable iron core including a first inside diameter portion on the rear end side of which being secured to said outside diameter portion of said operating rod and a second inside diameter portion on the front end side of said movable iron core, said second inside diameter portion being formed so as to have an oil flow gap with respect to said outside diameter portion of said operating rod;

a magnetic sleeve bearing secured to the inside diameter of said magnetic path iron core to support said hollow movable iron core; and a nonmagnetic stopper washer passing through said operating rod and inserted into an axially extending air gap formed between said fixed iron core and said movable iron core, said nonmagnetic stopper washer having an oil flow notch for allowing oil to flow in an axial direction of said electromagnetic solenoid.

2. An electromagnetic solenoid for oil hydraulic control valves according to claim 1, in which said oil flow notch member of said sleeve bearing comprises a plurality of notch portions.

3. An electromagnetic solenoid for oil hydraulic control valves according to claim 1, in which said oil flow notch member of said sleeve bearing is formed into a groove-like notch portion.

4. An electromagnetic solenoid for oil hydraulic control valves according to claim 1, in which said oil flow notch member of said operating rod comprises a plurality of notch portions.

5. An electromagnetic solenoid for oil hydraulic control valves according to claim 1, in which said oil flow notch member of said operating rod is formed into a groove-like notch portion.

6. An electromagnetic solenoid for oil hydraulic control valves according to claim 1, in which said oil flow notch member of said nonmagnetic stopper washer comprises a plurality of notch portions provided at the inside diameter portion thereof.

7. An electromagnetic solenoid for oil hydraulic control valves according to claim 1, in which said first inside diameter portion of said hollow iron core in smaller than said outerside diameter portion of said operating rod and said second inside diameter portion of said hollow iron core in larger than said outerside diameter portion of said operating rod so as to form said oil flow gap with respect to said outside diameter portion.

* * * * *